United States Patent

Erspamer et al.

[15] 3,646,537
[45] Feb. 29, 1972

[54] AUTOMATIC GAIN CONTROL FOR AN ELECTROMECHANICAL TRANSDUCER

[72] Inventors: James R. Erspamer; George W. Snyder, both of Phoenix, Ariz.

[73] Assignee: Sperry Rand Corporation

[22] Filed: Mar. 13, 1970

[21] Appl. No.: 19,198

[52] U.S. Cl. .............................. 340/197, 340/211, 318/647
[51] Int. Cl. ....................................................... G08c 19/00
[58] Field of Search .................. 340/211, 197, 198; 318/647; 33/204 PA

[56] References Cited

UNITED STATES PATENTS 2,766,426  10/1956  Wilhelm ................................ 340/197
2,700,745  1/1955  Depp .................................... 340/198
3,197,565  7/1965  Yoder ................................... 340/211

Primary Examiner—Thomas B. Habecker
Attorney—S. C. Yeaton

[57] ABSTRACT

An automatic gain control for an electromechanical transducer apparatus for indicating direction which includes a transmitter, an amplifier and a receiver. The automatic gain control provides a constant output despite the presence of undesired variations in the strength of the horizontal component of the earth's magnetic field. The automatic gain control detects the amplitude of the undesired variations and controls the variable impedance that varies the gain of the amplifier in inverse proportion to the field strength thereby maintaining a constant output to the receiver.

9 Claims, 1 Drawing Figure

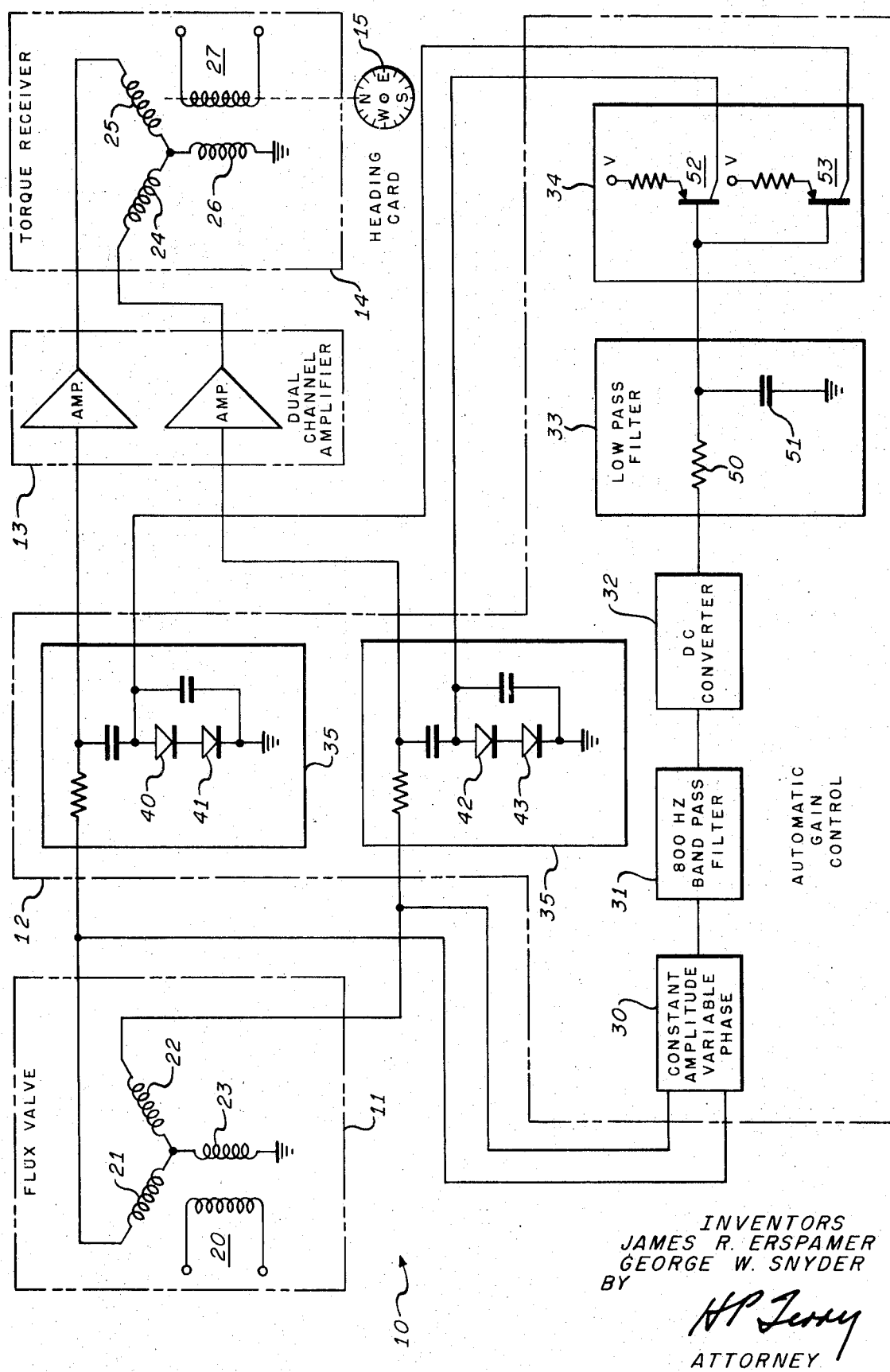

AUTOMATIC GAIN CONTROL FOR AN ELECTROMECHANICAL TRANSDUCER

BACKGROUND OF THE INVENTION

1. Field of the Invention

The present invention relates to instruments used for determining direction by sensing orientation with respect to the horizontal component of the earth's magnetic field. Specifically, electromechanical transducers having flux valves, amplifiers and torque receivers.

2. Description of the Prior Art

Direction as determined from magnetic compass systems is subject to errors due to variations in the strength of the horizontal component of the earth's magnetic field. These variations are particularly pronounced when moving from high to low latitudes because at the higher latitudes the horizontal component of the field strength is greatly reduced as compared to the field at the lower latitudes. Thus, at the higher latitudes the flux valve, which is the sensor in the magnetic compass, provides a much weaker signal than at lower latitudes and a constant gain amplification results in a lower output to the torque receiver. This type of variation in signal strength is referred to as a change in gradient. The torque receiver develops a correspondingly lower torque and responds in a sluggish fashion thereby introducing errors into the heading indicator.

Prior art devices have attempted to compensate for this decrease in field strength by controlling the amplifier gain. Amplifier gain control has been provided by a signal obtained from a synchro control transformer connected to a flux valve output. The primary winding on the rotor of the synchro control transformer is used to generate a signal indicative of the alignment between the rotor and the flux valve signal. For decreased field strengths the flux valve signal decreases and the sensitivity of the system is decreased. To compensate this decreased sensitivity, a secondary rotor winding is disposed to provide a maximum signal when the primary rotor winding indicates a null. The secondary rotor winding signal is representative of the horizontal component of the earth's magnetic field and inversely proportional to the primary rotor winding signal. Therefore, when the field strength is low, the output from the primary winding is low and the output from the secondary winding is high. Conversely, when the field strength is high, the output from the primary winding is high and the output from the secondary winding is low. The signal from the secondary rotor winding is used to control the gain of the amplifier for the primary winding signal. However, the secondary winding is subject to variations in rotor orientation and rotor errors as well as variations in the horizontal field strength. Consequently, the signal from the secondary winding which controls the gain of the amplifier also contains components effected by rotor orientation and rotor errors. Failure to compensate these effects will result in changes of torque gradient over large variations in field strengths. These undesired effects are eliminated in the present invention by providing the compensation on the output of the flux valve, prior to electrical or electromechanical processing of the flux valve signal. Further, the present invention maintains a constant high-level torque gradient throughout a 10 to 1 variation in horizontal field strength.

SUMMARY OF THE INVENTION

The present invention provides automatic gain control for the induced voltage signals of a flux valve in an electromechanical transducer. Amplitude changes in the flux valve output signals are detected and a varying DC voltage signal inversely proportional to field strength is obtained. The varying DC voltage signals is converted to a current control signal in a current generator. A variable impedance network has its dynamic impedance altered by the current control signal. An increase in magnitude of the current control signal causes a reduction in dynamic impedance and a reduction in magnitude of the current control signal causes an increase in dynamic impedance. Linearly altering the variable impedance results in continuous variations of amplitude gain. Continuously varying the amplifier gain to compensate for changes in the flux valve signal due to variations in field strength enables application of constant amplitude signals to a torque receiver. The torque receiver develops a constant torque eliminating errors in rotational accuracy due to friction in the torque receiver at low field strengths. Efficiency of the torque receiver is increased by further elimination of circulating currents caused by an unbalance in stator and rotor voltages. In addition, maintaining a constant torque gradient minimized heading card oscillations due to mechanical vibrations of the torque receiver.

BRIEF DESCRIPTION OF THE DRAWING

The signal FIGURE is a schematic wiring diagram of a dual channel flux valve repeater incorporating the present invention.

DESCRIPTION OF THE PREFERRED EMBODIMENT

The present invention will be described as incorporated in the dual channel flux valve repeater 10 of the drawing. The dual channel flux valve repeater 10 consists of a flux valve 11, automatic gain control circuit 12, dual channel amplifier 13, torque receiver 14 and heading card 15. The flux valve 11 is conventional having its sensitive element pendulously mounted and responsive to the horizontal component of the earth's magnetic field. Flux valve 11 has an exicitation coil 20 and three Y-connected induction windings 21, 22 and 23 which function in a well known manner to generate induced voltage signals. The outer extremity of winding 23 is connected to ground potential and the outer extremities of windings 21 and 22 provide the induced voltage signals which are indicative of the true angular disposition of flux valve 11 with respect to the horizontal component of the earth's magnetic field. The dual channel amplifier 13 consists of conventional circuits connected between automatic gain control circuit 12 and torque receiver 14 and supplies the desired amplification and waveshaping to the dual outputs. The torque receiver 14 consists of a stator having three Y-connected windings 24, 25 and 26 and a rotor 27. The outer extremity of winding 26 is connected to ground potential and the outer extremities of windings 24 and 25 receive the amplified voltage signals from dual channel amplifier 13. Current flows in stator windings 24, 25 and 26 as a result of the received voltage signals. The rotor 27 rotates in responding to the resulting magnetic field set up in the stator windings and direction is indicated by the heading card 15 which is coupled to the rotor 27.

Automatic control circuit 12 consists of constant amplitude variable phase circuit 30, 800 Hz. band-pass filter 31, DC converter 32, low-pass filter 33, current generator 34 and variable impedance networks 35. Constant amplitude variable phase circuit 30 receives the dual vector outputs that are rich in harmonics from the extremities of windings 21 an 22 of flux valve 11 and generates a single vector resultant output in which only one of these frequencies (800 Hz. as shown) has a constant amplitude and variable phase. If the orientation of the flux valve 11 is varied while the horizontal component of the earth's magnetic field remains constant, the magnitude of each of the dual vector outputs will change but the magnitude of the vector resultant will remain constant. However, if the horizontal component of the earth's magnetic field changes, the magnitude of each of the dual vector outputs and the magnitude of the vector resultant will change. The magnitude of the change in the vector resultant will be proportional to the variation in each of the dual vector outputs produced by the change in the horizontal component. The 800 Hz. band-pass filter 31 attenuates all other frequencies producing an 800 Hz. output signal of constant amplitude and variable phase. The 800 Hz. output signal is converted into a DC voltage inversely proportional to field strength by DC converter 32. Low-pass filter 33 consisting of resistor 50 and capacitor 51 eliminates voltage variations in the DC voltage due to flux valve oscillations. The filtered DC voltage is applied to dual channel current generator 34 which consists of a pair of PNP transistors 52 and 53. Collector current in the microamp range in PNP transistors 52 and 53 is proportional to the filtered DC voltage and controls the dynamic impedance of diodes 40, 41, 42 and 43. The dynamic characteristic of the diodes are matched in pairs 40 and 42; 41 and 43.

An electromechanical transducer of the type described herein mounted in an aircraft moving from high to low latitudes is subjected to changes in the horizontal component of the earth's magnetic field strength. These changes produce proportional variations in the amplitudes of the voltage signals induced in windings 21, 22 and 23 of flux valve 11. The amplitude of the single vector resultant output from the constant amplitude variable phase circuit 30 varies proportionately to the variations in the induced voltage signals in flux valve 11. This variation in amplitude is present in the 800 Hz. component signals of band-pass filter 31. DC converter 32 detects the changing amplitude and generates a varying DC voltage that is inversely proportional to variations in field strength. Dual channel current source 34 is responsive to the filtered varying DC voltage received from low-pass filter 33 and provides linear variations in the dynamic impedance of the matched diodes 40, 42 and 41, 43. The linear variations in the dynamic impedance are inversely proportional to the changes in field strength. Consequently, when the field strength is low, dynamic impedance is high and when the field strength is high, dynamic impedance is low. Therefore, the gain in each channel of dual channel amplifier 13 is linearly compensated by the linear variations in the output dynamic impedance of each channel. The present invention thereby eliminates the effect of changes in the horizontal component of the earth's magnetic field and maintains a constant torque gradient in the torque receiver 14.

While the invention has been described in its preferred embodiment, it is to be understood that the words which have been used are words of description rather than limitation and that changes may be made without departing from the true scope and spirit of the invention in its broader aspects.

We claim:

1. An electromechanical transducer apparatus which produces undesired amplitude variations due to changes in the strength of the horizontal component of the earth's magnetic field having transmitter means and receiver means, an improvement comprising
   automatic signal control means connected between said transmitter means and said receiver means comprising amplitude detection means connected to said transmitter means for detecting undesired amplitude variations in the output signals of said transmitter means and providing an output control signal at an output terminal which is linearly proportional to said undesired amplitude variations, and
   variable impedance means connected between said transmitter means and said receiver means, said variable impedance means being coupled to said automatic signal control output terminal and having dynamic impedance characteristics that change in a manner inversely proportional to said output control signal thereby eliminating the effects of said undesired amplitude variations.

2. An electromechanical transducer apparatus which produces undesired amplitude variations due to changes in the strength of the horizontal component of the earth's magnetic field having amplifying means connected between transmitter means and receiver means, an improvement comprising:
   automatic gain control means connected between said transmitter means and said amplifying means comprising amplitude detection means connected to said transmitter means for detecting undesired amplitude variations in the output signals of said transmitter means and providing an output control signal linearly proportional to said undesired amplitude variations, and
   variable impedance means connected between said transmitter means and said amplifying means, said variable impedance means being coupled to said automatic signal control output terminal and having dynamic impedance characteristics for changing the gain of said amplifying means in a manner inversely proportional to said output control signal thereby eliminating the effects of said undesired amplitude variations.

3. In apparatus of the character recited in claim 2 in which said amplitude detection means includes
   combining means connected to said transmitter means for combining a plurality of transmitter output signals and generating a signal with amplitude variations linearly related to the amplitude of said undesired amplitude variations,
   filter means connected between said combining means and peak detector means providing a filtered output signal containing frequencies within a specified bandwidth,
   said peak detector means detecting the amplitude of said filtered output signal producing a control signal linearly proportional to said undesired amplitude variation, and
   current source means connected between said peak detector means and said variable impedance means for converting said control signal into a varying current signal.

4. In apparatus of the character recited in claim 2 in which amplifying means comprises identical first and second parallel paths having substantially identical components in each path.

5. In apparatus of the character recited in claim 2 in which variable impedance means comprises identical first and second parallel paths having matching dynamic impedance characteristics.

6. In apparatus of the character recited in claim 5 in which said first and second parallel paths include semiconductor devices.

7. In apparatus of the character recited in claim 6 in which said semiconductor devices includes matched pairs of diodes.

8. In apparatus of the character recited in claim 3 in which said current source means includes a transistorized current generator.

9. In electromechanical transducer apparatus of the character recited in claim 3 in which said transmitter means includes a flux valve having a plurality of output signals that have said undesired amplitude variations resulting from variations in the horizontal component of the earth's magnetic field, said combining means includes a vectorial combiner producing an output of constant amplitude regardless of the orientation of said flux valve in the earth's magnetic field and producing an output of variable amplitude linearly proportional to said variations in the horizontal component of the earth's magnetic field, said receiver means includes a torque receiver adapted to position a heading card for indicating direction.

* * * * *